(12) United States Patent
Olbrich et al.

(10) Patent No.: US 7,563,431 B2
(45) Date of Patent: Jul. 21, 2009

(54) NICKEL HYDROXIDE AND METHOD FOR PRODUCING SAME

(75) Inventors: Armin Olbrich, Seesen (DE); Juliane Meese-Marktscheffel, Goslar (DE); Viktor Stoller, Bad Harzburg (DE); Michael Erb, Salzgitter (DE); Sven Albrecht, Goslar (DE); Gerhard Gille, Goslar (DE); Gerd Maikowske, Goslar (DE); Frank Schrumpf, Goslar (DE); Josef Schmoll, Goslar (DE); Matthias Jahn, Goslar (DE)

(73) Assignee: H. C. Starck GmbH (DE)

( * ) Notice: Subject to any disclaimer, the term of this patent is extended or adjusted under 35 U.S.C. 154(b) by 749 days.

(21) Appl. No.: 10/488,441

(22) PCT Filed: Jun. 24, 2002

(86) PCT No.: PCT/EP02/06947

§ 371 (c)(1),
(2), (4) Date: Aug. 20, 2004

(87) PCT Pub. No.: WO03/004418

PCT Pub. Date: Jan. 16, 2003

(65) Prior Publication Data

US 2004/0265217 A1    Dec. 30, 2004

(30) Foreign Application Priority Data

Jul. 6, 2001   (DE) .................. 101 32 895

(51) Int. Cl.
C01B 13/00   (2006.01)

(52) U.S. Cl. ............... 423/594.19; 423/263; 423/277; 423/594.3; 423/594.4; 423/265; 423/275; 429/223

(58) Field of Classification Search ............ 423/594.19, 423/263, 277, 594.3, 594.4, 265, 275; 429/223
See application file for complete search history.

(56) References Cited

U.S. PATENT DOCUMENTS

| | | | | |
|---|---|---|---|---|
| 5,468,403 | A | | 11/1995 | Romanelli et al. ......... 252/47.5 |
| 5,498,403 | A | * | 3/1996 | Shin ..................... 423/594.19 |
| 6,129,902 | A | * | 10/2000 | Sakamoto et al. ........ 423/594.4 |
| 6,228,535 | B1 | * | 5/2001 | Fierro et al. ................ 429/223 |
| 6,576,205 | B2 | * | 6/2003 | Babjak et al. ............... 423/142 |
| 6,958,139 | B1 | * | 10/2005 | Glemser et al. ........ 423/594.19 |

FOREIGN PATENT DOCUMENTS

| | | |
|---|---|---|
| EP | 0 856 899 | 8/1998 |
| EP | 1 103 526 | 5/2001 |
| JP | 56-143671 | * 11/1981 |
| JP | 61-181074 | * 8/1986 |
| JP | 02-006340 | * 1/1990 |
| JP | 03-252318 | 11/1991 |
| JP | 06-340427 | * 12/1994 |

* cited by examiner

*Primary Examiner*—Steven Bos
(74) *Attorney, Agent, or Firm*—Connolly Bove Lodge & Hutz LLP

(57) ABSTRACT

A process for preparing nickel hydroxide by alkaline precipitation from nickel salt solutions in the presence of complexing agents, in which the precipitation is carried out at at least two different locations in the same mother liquor with different precipitation kinetics at the different locations and the mother liquor is mixed prior to agglomeration of the precipitated primary crystals, is described.

12 Claims, 4 Drawing Sheets

NICKEL HYDROXIDE AND METHOD FOR PRODUCING SAME

The present invention relates to a process for preparing nickel hydroxide and novel nickel hydroxides for use as active composition in rechargeable batteries.

It is known that nickel hydroxide can be prepared by precipitation from nickel salt solutions using alkali metal hydroxides in, the presence of ammonia, with simultaneous generation of high shear forces in the precipitation solution. This gives approximately spherical nickel hydroxide particles having diameters of from 5 to 15 µm. The spherical nickel hydroxide particles are made up of primary crystals having a crystallite size in the order of 100 Å, and secondary particles formed therefrom by stacking which have a size of the order of a few 100 nm and are in turn agglomerated to form the spherical tertiary particles.

While size and defect structure of the primary crystals depends directly on the precipitation conditions at the place where the reactants come together, i.e. on local supersaturation and nucleation frequency, size and morphology of the tertiary particles are determined essentially by the steady-state flow conditions in the reactor and to a certain extent on the primary crystal size.

Rechargeable batteries based on Ni utilize the reversible redox process between nickel(II) hydroxide and nickel(III) oxyhydroxide. The nickel oxyhydroxide is reduced during discharge by uptake of a proton from the surrounding electrolyte and an electron from the output electrode which is in contact with the active composition to form nickel hydroxide which has previously been oxidized to oxyhydroxide during charging.

A property which limits the discharging characteristics of the active composition is the proton conductivity of the material. It is favoured by the many grain boundaries and defects due to the material being made up of fine crystallites and by a pore structure into which the electrolyte can penetrate.

Superimposed on the above described classical 1-electron step (reversible oxidation of $Ni^{2+}$ to $Ni^{3+}$, β phase cycling) is a partial formation of γ phases (α-γ cycling with partial oxidation to $Ni^{4+}$) which is favoured by the defect structure and allows a 1.67 electron step, so that the actual nickel utilization, i.e. the 1-electron steps per nickel atom, can exceed 100%.

The smaller the primary crystallite size, the greater the initial charging/discharging capacity. In contrast, large primary crystals lead to better long-term stability of the charging/discharging capacity ("cycling stability").

A further important characteristic of the nickel hydroxide powder is the tapped density, which correlates with the tertiary particle size. The tertiary particle size in turn depends on the primary crystal size, since at a small primary particle size the agglomerates obviously appear "smooth" even at relatively small dimensions, i.e. too few anchoring opportunities on their surface for further attachment of primary or secondary particles. Furthermore, agglomerate growth can be influenced by a high ammonia content due to complex formation on the surface.

There are a number of possible ways of influencing the coming together of the reactants for the precipitation reaction in a, targeted manner; for example, when introducing a nickel salt solution into an alkaline ammonia-containing solution, the initial supersaturation or nucleation rate can be set by choice of the pH in the range from 9 to 14 so that the desired primary crystal size is obtained. When a nickel-ammine complex, for example a hexamminenickel complex, is fed into the precipitation reactor, the initial supersaturation of the solution is reduced by the necessity of conversion of the hexammine complex to the hexaquo complex over a plurality of stages, with the alkaline solution being able to have a higher pH to achieve appropriate supersaturation. In addition, the particle formation can be controlled via the temperature selected in the precipitation reactor, with higher temperatures leading to larger primary crystals.

The competing effects which the defect density and grain boundary density have on the short-term and long-term capacity and the processibility (electrode pasting) of the nickel hydroxides determine and finally limit the performance of spherical nickel hydroxides to the currently achieved levels. Accordingly, the optimum performance of the spherical nickel hydroxides to date has been achieved by a compromise in respect of the microscopic and mesoscopic structure. The crystallite sizes, which should actually be as small as possible, and the defect densities, which should be as high as possible, are set, depending on the process, so that sufficiently good agglomeration behaviour leads to good tapped densities and the long-term behaviour is sufficient for the requirements of a battery which can be recharged sufficiently often. Finally, the volume-based capacity $C_v$, which is formally given by the mass-based capacity $C_m$ multiplied by the tapped density $\rho_t$, has to be as large as possible for a very wide range of numbers of cycles.

It is an object of the present invention to overcome the limits of the compromise previously necessary. A further object of the invention is to provide nickel hydroxides which have a high volume-based capacity and are stable for a long time.

It has now been found that this can be achieved when the precipitation of the nickel hydroxide primary crystals is carried out essentially simultaneously at different precipitation kinetics so that the primary crystals have different dimensions and the suspension containing these primary crystals is mixed prior to agglomeration of the primary crystals so that the secondary and/or tertiary particles are built up of primary crystals having a broad size distribution. The different precipitation kinetics are preferably generated at different locations in the precipitation reactor.

The present invention accordingly provides a process for preparing spherical nickel hydroxide by alkaline precipitation from nickel salt solutions in the presence of complexing agents, which is characterized in that the precipitation takes place with different precipitation kinetics at at least two different locations in the same mother liquor and the mother liquor is mixed prior to agglomeration of the precipitated primary crystals.

According to the invention, the agglomeration of the primary crystals occurs in a stirred vessel containing the mother liquor. The mother liquor preferably has a neutral salt content of from 0.2 to 2 mol/l of alkali metal salts, preferably alkali metal chloride and/or alkali metal sulphate, and preferably contains from 0.2 to 1 mol/l of ammonia and from 0.08 to 2 mol/l, preferably from 0.08 to 0.15 mol/l, of alkali metal hydroxide, preferably sodium hydroxide.

According to the invention, nickel salt solutions are then introduced into the mother liquor via a plurality of physically separate inlets in such a way that different precipitation conditions are generated at the different, physically separate inlet points.

According to a first embodiment according to the invention, nickel salt solutions having different nickel salt concentrations are introduced at the physically separate inlet points.

According to a further embodiment of the invention, nickel salt solutions having different temperatures are introduced at the physically separate inlet points.

According to a further embodiment of the invention, nickel salt solutions which mix at different speeds with the mother liquor are introduced at the physically separate inlet points.

According to a further embodiment of the invention, alkali solutions having different pH values are introduced simultaneously at the physically separate inlet points.

According to a further embodiment of the invention, nickel salt solutions having different concentrations of trivalent metal ions other than nickel which have an ionic radius different from that of nickel and act as crystal growth inhibitors are introduced at the physically separate inlet points. Suitable metal ions other than nickel are B, Al, In, Tl, Se, Y, La, lanthanoides and/or Bi.

In a particularly preferred embodiment of the invention, nickel-ammine complex solutions having different concentration ratios of ammonia to nickel are introduced at the physically separate inlet points. Preference is given to the ratio of ammonia to nickel at one inlet point being at least 4, preferably at least 5, and that at a second inlet point being not more than 2, preferably not more than 1, particularly preferably about 0. At a third and further inlet point, the ammonia to nickel ratio lies between the two abovementioned extremes.

All the abovementioned measures result in different precipitation kinetics at the physically separate inlet points and thus the generation of primary crystals of differing sizes. The effect in producing different precipitation kinetics is preferably reinforced by combining a plurality of the measures selected from among different concentrations, different, temperatures, different mixing rates, different pH values and different complexation so as to reinforce the difference in the precipitation kinetics at the respective inlet points.

Thus, the solution having the highest ammonia/nickel ratio particularly preferably has a lower nickel concentration than the solution having the lowest ammonia/nickel ratio.

Furthermore, the difference in the precipitation kinetics is increased by introducing the solution having the lowest ammonia/nickel ratio at a higher temperature than the solution having the higher ammonia/nickel ratio.

Furthermore, the difference in the precipitation kinetics at the physically separate inlet points can be increased by mixing the solution having the lowest ammonia/nickel ratio more rapidly with the mother liquor than the solution having a higher ammonia/nickel ratio is mixed with the mother liquor.

In addition, the difference in the precipitation kinetics can be increased by generating a higher pH at the inlet point for the solution having the lowest ammonia/nickel ratio than at the points having a higher ammonia/nickel ratio.

According to the invention, the introduction into the mother liquor can be carried out in the stirred vessel itself or in an external loop line through which the mother liquor is circulated by pumping and which is provided with a plurality of inlets arranged in succession in the loop line.

The process of the invention is preferably carried out continuously, with a mother liquor suspension containing 25-125 g/l of nickel hydroxide being maintained in the stirred, vessel. This can be carried out by appropriate removal of the mother liquor from the suspension by means of suitable filters, cyclones or centrifuges. For example, the fractionation is carried out so that nickel hydroxide particles having a diameter of from 5 to 20 µm are obtained as product, a fraction containing smaller nickel hydroxide particles is returned to the stirred vessel and a third fraction consisting essentially of mother liquor which has been freed of nickel hydroxide is discharged from the process:

The invention further provides nickel hydroxides which are obtainable by the process of the invention. The preparation of nickel hydroxide by alkaline precipitation carried out with different precipitation kinetics at at least two different locations in the same mother liquor leads to the formation of primary crystals having different sizes. The nickel hydroxides of the invention therefore have a particle size distribution of the primary particles which is multimodal. i.e. at least bimodal. The modality of the particle size distribution generally corresponds to the number of locations with different precipitation kinetics at which the alkaline precipitation is carried out.

When used as active composition in rechargeable batteries, the nickel hydroxides display a high volume capacity and a high cycling stability. In open test cells, a capacity of at least 107%, preferably at least 108%, based on the 1-electron step of nickel in the 2nd charging/discharging cycle is achieved.

To determine the capacity in open test cells, the following procedure is employed: to produce electrode blanks, round discs are stamped from nickel sponge by means of a hollow punch (diameter: 35 mm), narrow strips (about 4 mm wide) are cut from nickel sheet (purity: 99.0%) and these strips are welded tangentially onto the nickel foam discs using a point welding apparatus.

To produce a paste for the negative electrodes, 100.0 g of metal hydride powder, 3.0 g of Ni powder, 16.0 g of carboxymethylcellulose solution (5% strength by weight), 5.0 g of deionized water and 5.2 g of Teflon solution (Dyneon® TF 5032 PTFE; 60% strength by weight) are used. The constituents of the paste with the exception of the Teflon solution are firstly mixed, the Teflon solution is then added and the paste is mixed again. The paste is applied by means of a spatula to 2 nickel foam electrodes, the electrodes are dried and are pressed at a pressure of $15 \times 10^4$ N.

The nickel strips of two negative electrodes are welded together so that the Ni sponges and the nickel strips are located directly above one another.

To produce the positive electrodes when using uncoated nickel hydroxides, use is made of 20.0 g of nickel hydroxide, 2.0 g of cobalt suboxide, 4.0 g of carboxymethylcellulose solution (5% strength by weight), 2.2 g of deionized water and 1.1 g of Teflon solution (Dyneon® TF 5032 PTFE; 60% strength by weight). When using coated nickel hydroxides, 22.0 g of nickel hydroxide are used without addition of cobalt suboxide and the other components of the paste remain the same.

The constituents of the paste with the exception of the Teflon solution are mixed, the Teflon solution is then added and the paste is mixed again. The paste is applied by means of a spatula to the nickel sponge electrode, the electrode is dried, pressed at a pressure of $15 \times 10^4$ N, wrapped in a polypropylene nonwoven as separator and the separator is welded at the edge. The electrodes are stacked to form a packet (the positive electrode in the middle and the two negative electrodes above and below) and this electrode packet is likewise wrapped in polypropylene nonwoven as separator and welded at the edge.

The electrode packet is installed together with 5 silicone rubber discs in the measurement cell (the silicone rubber discs serve as spacers and are intended to transmit the pressure of the closed measurement cell onto the electrode surfaces). The measurement cell is closed by means of a lid which is secured by bolts tightened to a torque of 2 Nm. As electrolyte, 5 ml of an alkali metal hydroxide solution (7.2M KOH and 1.0M LiOH) are placed in the measurement cell.

For the measurement, the positive electrode (nickel hydroxide electrode) is connected as working electrode and the negative electrode (metal hydride electrode) is connected as counterelectrode. As standard measurement program, the cell is charged at a current of 0.1 C for 15 hours over 50 cycles, resulting in 1.5-fold overcharging, and discharged at the same current to 1.0V.

The high cycling stability is shown by the fact that the nickel hydroxide still has a capacity of at least 95%, preferably at least 98%, based on the 1-electron step of nickel even in the 30th charging/discharging cycle.

Owing to this property, the nickel hydroxide can be used, for example, as active composition in rechargeable batteries.

The invention is described in more detail with the aid of the following figures without restricting its generality:

Figure 1:
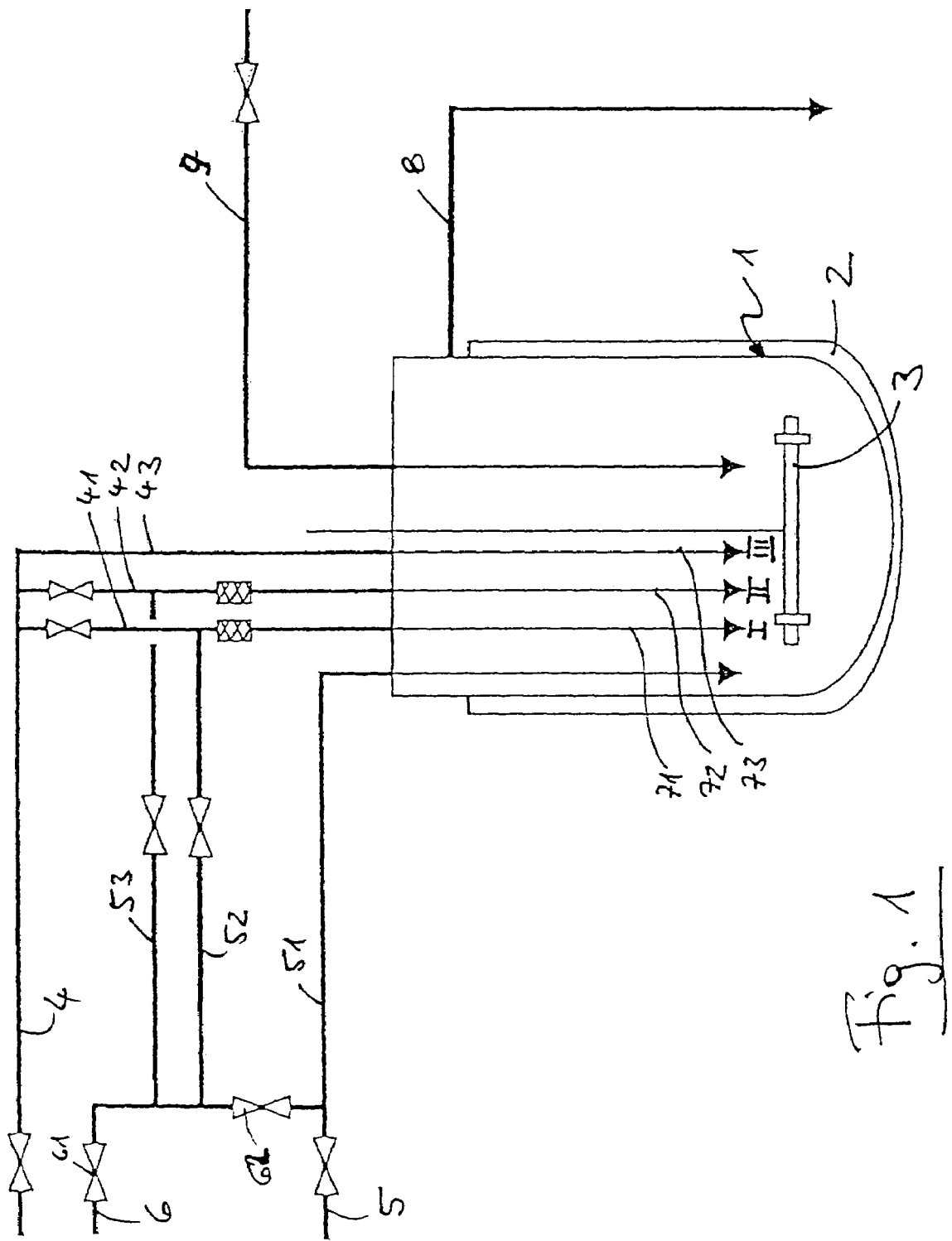
FIG. 1 shows a first embodiment of the invention in which the different precipitation kinetics at the physically separate inlet points are achieved by introduction of nickel salt solutions having different concentrations or nickel salt solutions having different degrees of complexation.

FIG. 1 shows the vessel 1 in which the mother liquor is present and which is provided with thermostating 2 and a stirrer 3. Nickel salt solution supplied through line 4 is divided into the substreams 41, 42 and 43 and introduced into the vessel 1. Ammonia solution is introduced into the mother liquor via line 51 and alkali metal hydroxide solution is introduced via line 9. The mother liquor suspension containing nickel hydroxide particles overflows via line 8.

To achieve different precipitation kinetics at the inlet points (I), (II) and (III), nickel salt solutions having different concentrations and/or different degrees of ammine complexation are introduced via the feed lines 71, 72 and 73. One way of achieving this is to keep valve 62 closed and mix the substreams 41 and 42 of the nickel salt solution with, via line 6, different amounts of diluent solution 52 and 53. Alternatively, the valve 61 can be kept closed and the valve 62 kept open and the nickel salt solutions can be mixed with different amounts of ammonia solution.

Figures 2, 2A:
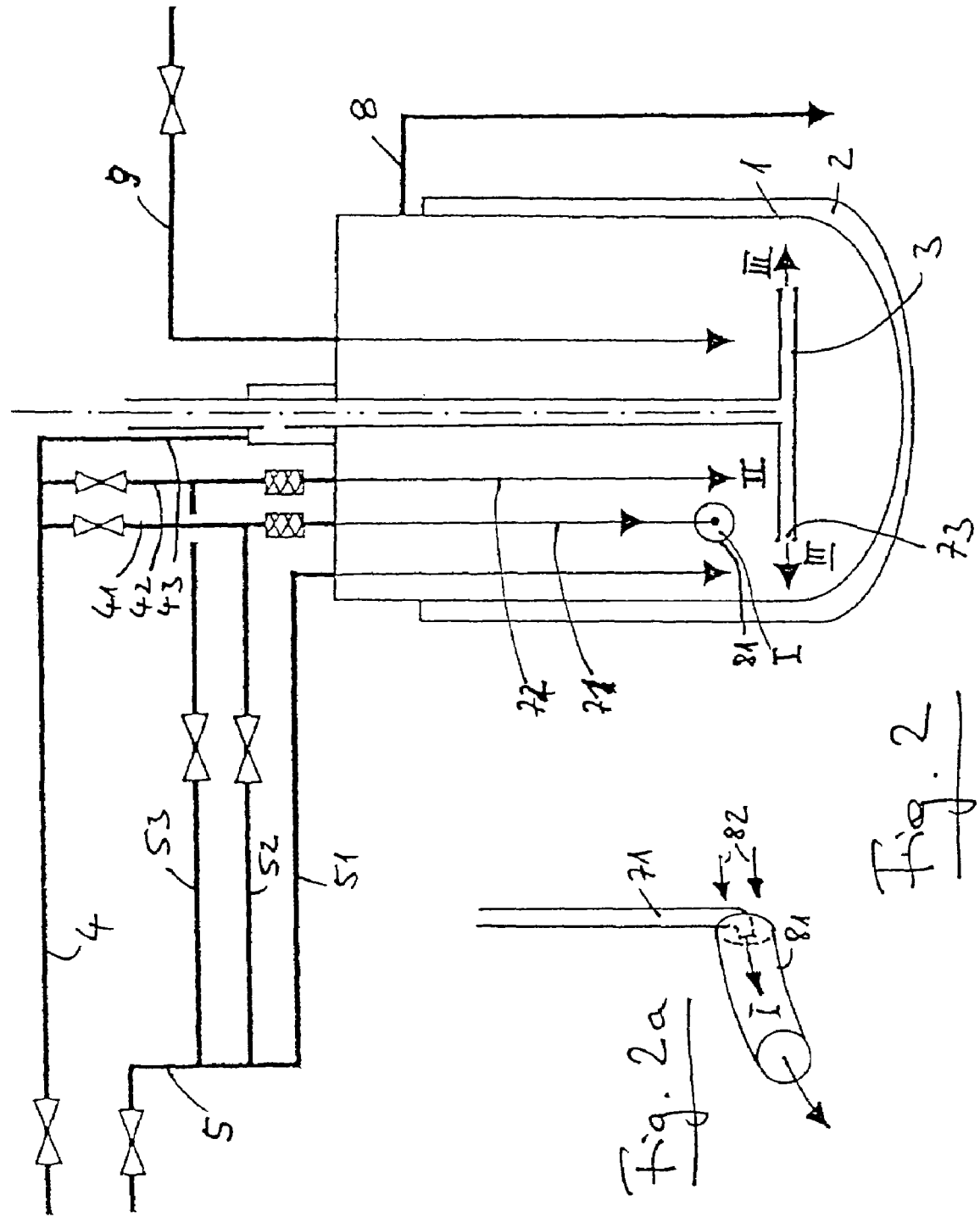
FIG. 2 shows an embodiment of the invention in which the different precipitation kinetics are achieved by the mixing of the nickel salt solution with the mother liquor occurring at different rates at the physically separate inlet points.
FIG. 2a shows a perspective view of a detail A from FIG. 2.

FIG. 2 shows an embodiment analogous to FIG. 1, with identical reference numerals designating analogous elements. A nickel salt substream is introduced via the hollow stirrer (line 73), and particularly fast mixing with the mother liquor occurs in the region of the inlet points (III). The nickel salt substream 41 introduced via line 71 enters a flow tube 81 which is tangential to the axis of the stirrer 3 and into which mother liquor flows as indicated by arrows 82 (FIG. 2a) so that the substream 41 is mixed only with the mother liquor flowing through the flow tube 81 during the nucleation phase. Accordingly, different mixing rates and thus different precipitation kinetics are produced at the inlet points (I) and (III). The substreams 41, 42 and 43 can also have a different degree of ammine complexation as a result of mixing with different quantities of ammonia solution 52 and 53.

Figure 3:
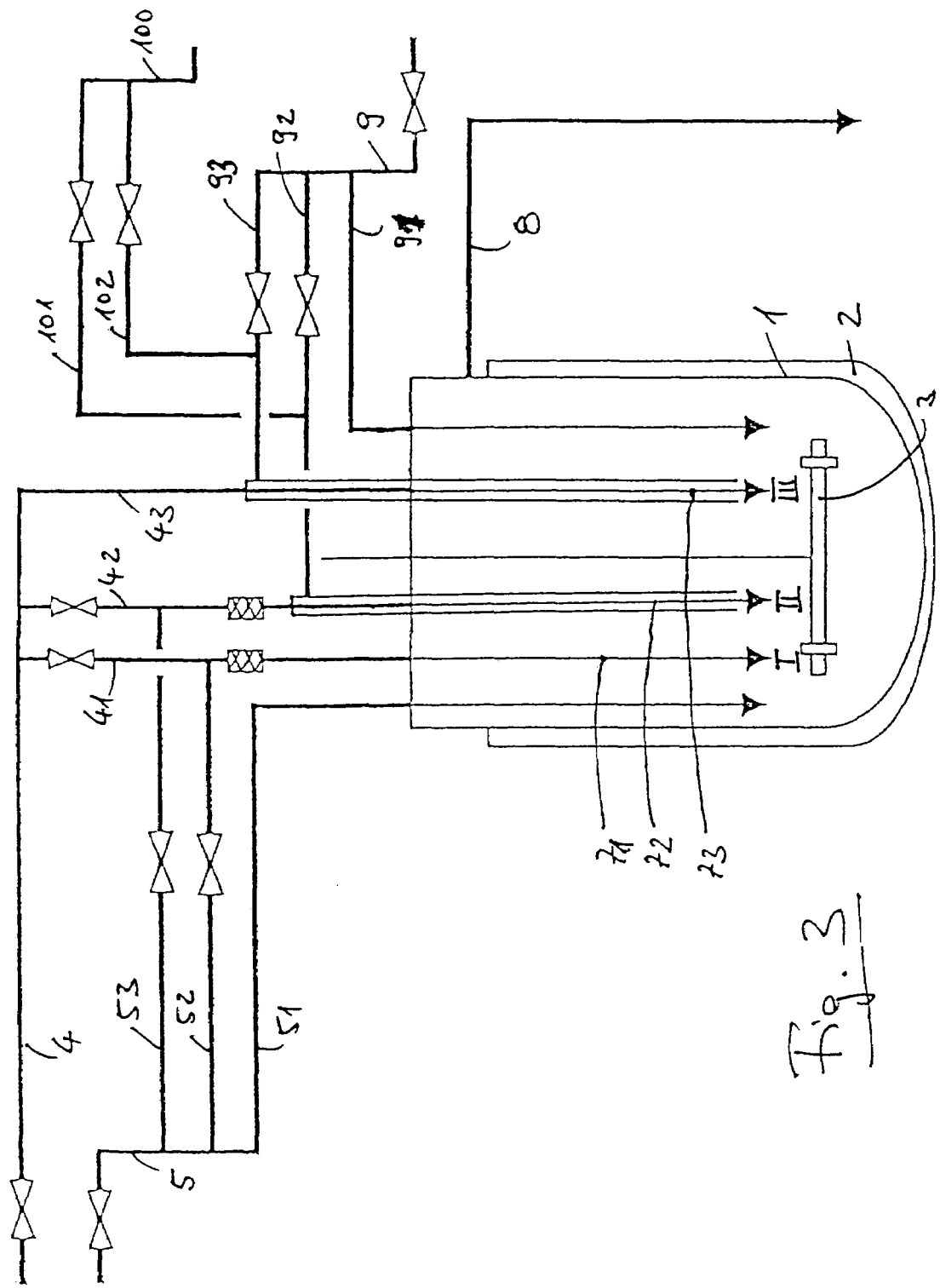
FIG. 3 shows an embodiment of the invention in which a different pH is generated at the physically separate inlet points.

FIG. 3 shows an analogous embodiment to that in FIG. 2. Here, the different precipitation kinetics at the inlet points (I), (II) and (II) for the nickel salt substreams 41, 42 and 43 are produced by a different pH being generated at the inlet points (II) and (III) by alkali metal hydroxide solutions having different pH values being introduced concentrically to the inlet lines for the nickel salt solutions. This is achieved by dividing the alkali metal hydroxide line 9 into substreams 91, 92 and 93, if appropriate with dilution by means of a diluent solution 100, preferably as recirculated mother liquor.

Figure 4:
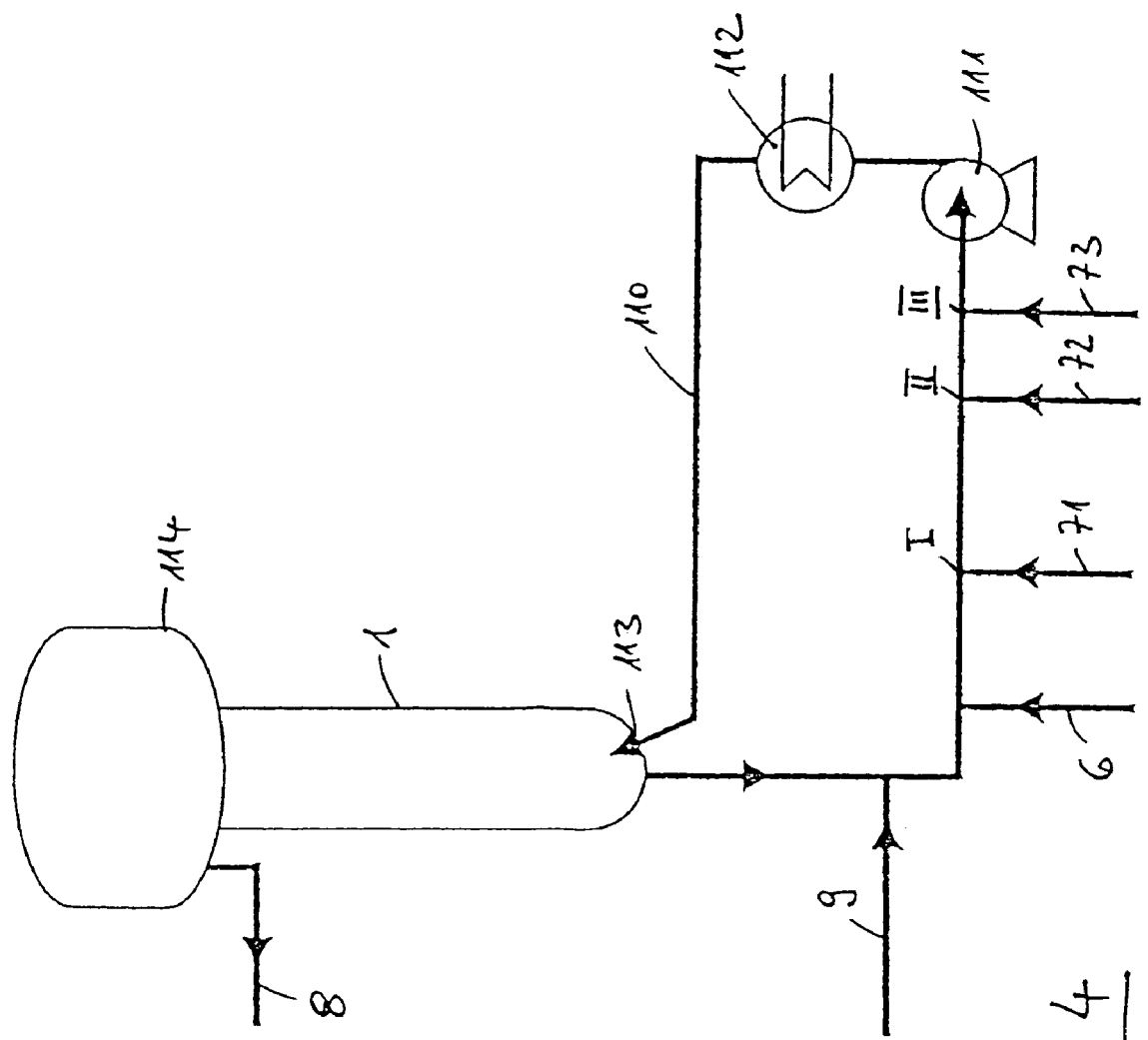
FIG. 4 shows an embodiment of the invention using a loop reactor.

FIG. 4 shows a further embodiment for preparing the product according to the invention in which a loop reactor configured as a jet reactor with external loop 110 which has a pump 111 and a heat exchanger 112 is used. The loop 110 has feed lines for alkali metal hydroxide solution 9, for ammonia solution 6 and for nickel salt solutions 71, 72 and 73 which have different degrees of ammine complexation, so that different precipitation kinetics are produced at the inlet points (I), (II) and (III). Agglomeration occurs in the cylindrical vessel 1 in which the primary particle suspension is injected via a nozzle 113 to generate locally high hydrodynamic shear.

The head 114 of the mother liquor vessel 1 is designed for any evaporation procedures for adjusting the solids density and removing excess ammonia.

The invention is illustrated by the following examples and comparative examples:

EXAMPLES

Example 1

According to the Invention 1 l/h of a nickel salt solution containing 105.4 g/l of $NiSO_4$ and 35 g/l of NaCl is fed via line 4 into a stirred reactor as shown in FIG. 1 having a utilizable capacity of 20 l at a constant temperature of 60° C. and a stirrer speed of 800 revolutions per minute (rpm) in three substreams, namely the nickel substream 41 of 150 ml/h, the nickel substream 42 of 250 ml/h and the nickel substream 43 of 600 ml/h. 80 ml/h of aqueous ammonia solution having an ammonia concentration of 200 g/l are supplied, to the reactor system via line 6 and divided into substreams so that the ammonia stream 53 amounts to 30 ml/h, the ammonia substream 52 amounts to 40 ml/h and the ammonia substream 51 amounts to 10 ml/h. The reactor is supplied via line 9 with 2 l/h of aqueous sodium hydroxide solution which contains a neutral salt and has an NaOH concentration of 35 g/l of NaOH together with 20 g/l of NaCl. During the entire time of the experiment, 2 l/h of clear mother liquor are pumped from the reactor via a PP membrane filter hose hanging into the reactor suspension in order to increase the solids content in the reactor. After the reactor has reached a steady state, the thickened suspension which flows out is filtered continuously through a laboratory suction filter over a period of 12 hours and the filtercake is subsequently washed firstly with 1 l of water, 1.5 l of washing water containing 0.5 g of NaOH/l and once again with 1.5 l of water. Drying for 24 hours at 60° C. in a drying oven gives 765 g of a free-flowing, dark green nickel hydroxide having a $d_{50}$ of the particle size distribution of 11.8 µm and a mean crystallite size of 80 Å. In open test cells, this nickel hydroxide has a capacity of 109%, based on the 1-electron step (OES) of nickel, in the 2nd cycle and a capacity of 99% in the 50th cycle.

(Comparative) Example 2

Example 1 according to the invention is repeated, except that the valves in the feed system are switched so that all of the nickel solution flows directly via line 43 into the reactor and mixing of the ammonia solution with the nickel solution is avoided before entry into the reactor. All other reaction conditions correspond to Example 1 according to the invention, and, after a steady state is reached, product is again collected over 12 hours and worked up analogously. This gives 771 g of free-flowing nickel hydroxide having a $d_{50}$ of the particle size distribution of 10.2 µm, a mean crystallite size of 58 Å and a capacity in open test cells of 105% based on the OES in the 3rd cycle and a capacity of 84% in the 50th cycle.

(Comparative) Example 3

Example 1 according to the invention is repeated, except for the difference that the valves in the feed system are switched so that all of the nickel solution flows directly via line 42 and all of the ammonia solution flows via line 53 so that the entire nickel stream is mixed with the entire ammonia solution before entry into the reactor. All other reaction conditions correspond to Example 1 according to the invention, and, after a steady state is reached, the product is again collected over 12 hours and worked up analogously. This gives 762 g of free-flowing nickel hydroxide having a $d_{50}$ of the particle size distribution of 13.6 µm, a mean crystallite size of 158 Å and a capacity in open test cells of 76% based on the OES in the 3rd cycle and a capacity of 81% in the 10th cycle.

The invention claimed is:

1. Process for preparing nickel hydroxide by alkaline precipitation from nickel salt solutions in the presence of complexing agents, wherein the nickel salt solutions are introduced into a mother liquor via several spatially separated inlets in such a way that precipitation takes place in at least two different locations, with different precipitation kinetics, in the mother liquor and the mother liquor is stirred prior to agglomeration of precipitated primary crystals.

2. Process according to claim 1, characterized in that the different precipitation kinetics are produced by different nickel ion concentrations, different alkali metal hydroxide concentrations, different concentrations of complexing agent, different temperatures, different rates of mixing with the mother liquor and/or different concentrations of metal ions other than nickel.

3. Process according to claim 1, characterized in that nickel-ammine complex solutions $[Ni(NH_3)_n(H_2O)_{6-n}]^{2+}$ are introduced into an alkali mother liquor, with solutions having different mean degrees of complexation n being introduced at different locations.

4. Process according to claim 3, characterized in that the different degree of complexation n is produced by different temperatures and/or different $Ni/NH_3$ ratios of the solutions.

5. Process according to claim 1, characterized in that a nickel salt solution and an alkaline solution are introduced at each of the different locations and the alkali metal hydroxide concentrations of the alkaline solutions are different.

6. Process according to claim 5, characterized in that the nickel salts solutions and the alkaline solutions are introduced concentrically.

7. Process according to claim 1, characterized in that trivalent ions having ion radii, which differ greatly from that of Ni, and which are selected from the group consisting of B, Al, In, Tl, Sc, Y, La, lanthanoides and Bi, are used in amounts of from 0.1 to 3% by weight based on Ni as metal ions other than nickel.

8. Process according to claim 1, characterized in that at least an inlet point is provided with a flow tube so that only mixing with a locally screened part of the mother liquor occurs initially.

9. Process according to claim 1, wherein the process is carried out in the presence of increased turbulence at least one inlet point.

10. Process ac cording to claim 1, characterized in that divalent dopants selected from the group consisting of Co, Zn, Mg, Ca, Sr and Ba are incorporated into the nickel hydroxide in amounts of from 0.3 to 7% by weight.

11. The process according to claim 1, wherein the nickel hydroxide has at least a bimodal primary particle size distribution.

12. The process according to claim 1, wherein the nickel hydroxide has a multimodal primary particle size distribution.

* * * * *

UNITED STATES PATENT AND TRADEMARK OFFICE
CERTIFICATE OF CORRECTION

| | |
|---|---|
| PATENT NO. | : 7,563,431 B2 |
| APPLICATION NO. | : 10/488441 |
| DATED | : July 21, 2009 |
| INVENTOR(S) | : Armin Olbrich et al. |

It is certified that error appears in the above-identified patent and that said Letters Patent is hereby corrected as shown below:

In Claim 10, in column 8, on line 27, "Process ac cording to claim 1, characterized in that" should read -- Process according to claim 1, characterized in that --.

Signed and Sealed this

Twenty-ninth Day of September, 2009

David J. Kappos
*Director of the United States Patent and Trademark Office*